Jan. 26, 1932.  W. S. RECTOR  1,842,999
SEEDER ATTACHMENT
Filed Dec. 31, 1929
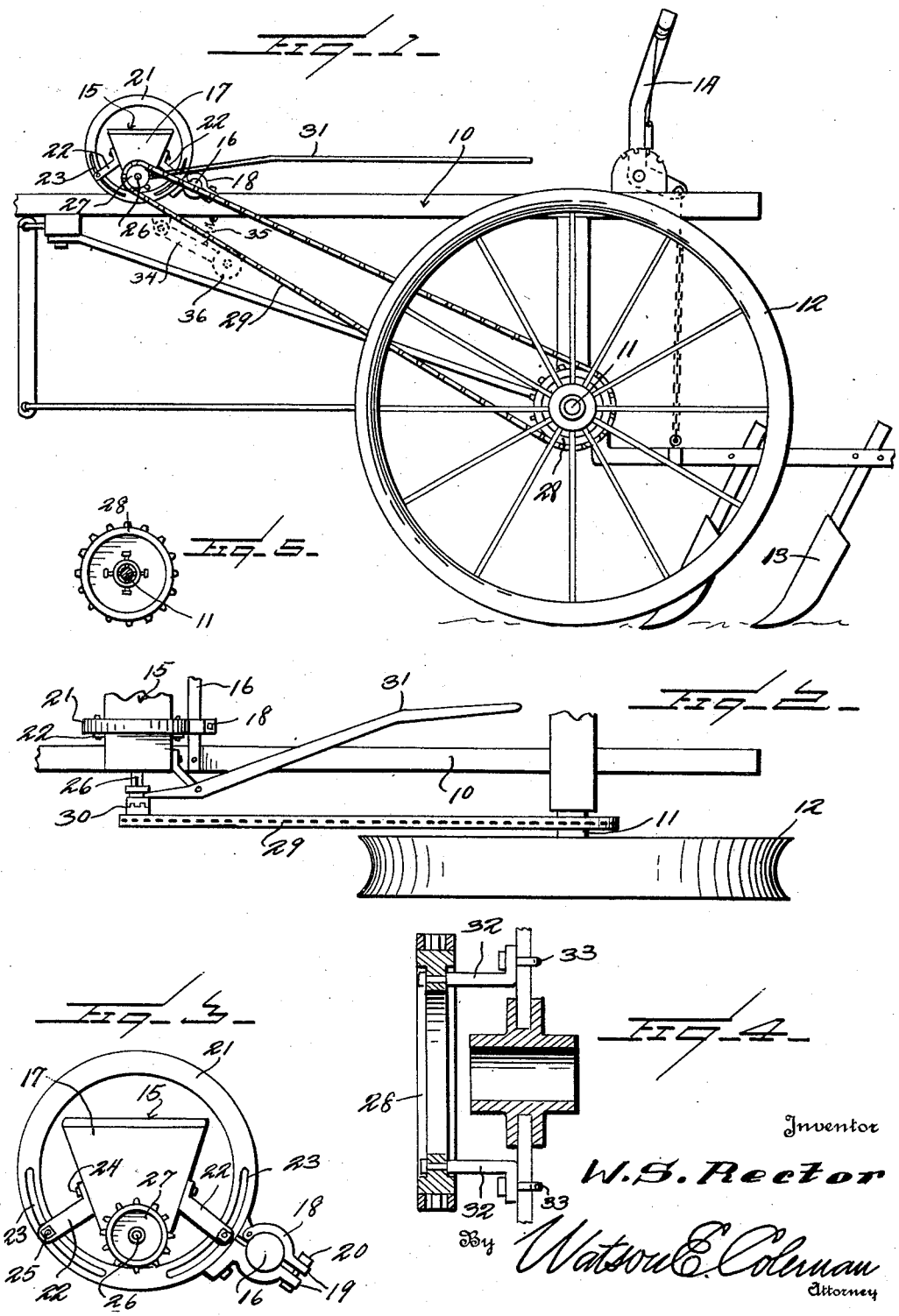
Inventor
W. S. Rector
By Watson E. Coleman
Attorney Patented Jan. 26, 1932

1,842,999

UNITED STATES PATENT OFFICE

WILBUR S. RECTOR, OF PARKER, SOUTH DAKOTA

SEEDER ATTACHMENT

Application filed December 31, 1929. Serial No. 417,766.

The present invention relates to farm implements and more particularly to attachments for seeders and cultivators.

An object of this invention is to provide an attachment by which a seeder may be used in combination with a cultivator of conventional construction without in any way altering the present structure of the cultivator.

Another object of this invention is to provide a device of this character by which it will be possible to spread or broadcast the seed in the newly cultivated ground without the necessity of going over the ground a second time so as to spread the seed thereon or to spread the seed by hand.

A further object of this invention is to provide means by which the seeder may be operated when the cultivator wheels are moved forwardly over the ground.

A still further object of this invention is to provide an attachment by which the seeder may be mounted on a cultivator in either the forward or rear thereof so that the seed may be spread forwardly of the cultivator and covered up or spread rearwardly of the cultivator upon the newly turned over ground.

The above and various other objects and advantages of this invention will in part be described in and in part understood from the following detailed description of the present preferred embodiment, the same being illustrated in the accompanying drawings wherein:—

Fig. 1 is a fragmentary detail side elevation of a cultivator having a device constructed according to the preferred embodiment of this invention mounted thereon;

Fig. 2 is a fragmentary detail top plan view of the device;

Fig. 3 is a detail side elevation of the device; and

Fig. 4 is a fragmentary transverse section showing the method of mounting the device on a wheel having a relatively broad rim.

Figure 5 is a detailed side elevation of a drive sprocket adapted to be mounted on a substantially small shaft.

Referring to the drawings wherein like numerals of reference designate corresponding parts throughout the several views, the numeral 10 designates generally the frame of a cultivator which is provided with the conventional axle 11 upon which may be mounted wheel members 12 or the like. The frame member 10 is provided with a plurality of conventional blades or the like 13 which are adapted to engage the ground, being controlled by conventional levers 14 or the like.

In the devices at present in use, it is necessary that several operations be employed in the cultivation and seeding of the ground, particularly the fall cultivation and seeding where it is desired to plant the seed so that the plot of ground may be used for late fall pasture or an early crop harvested in the spring. In order to eliminate the necessity of a separate machine or seeder which must be drawn over the cultivated ground, a seeding attachment has been devised which is adapted to be removably mounted on a cultivator of conventional type. Inasmuch as cultivators of various sizes and types, both horse-drawn and tractor-operated, are at present in use, a seeder generally designated by the numeral 15 is adapted to be removably mounted on a transverse bar 16 of a conventional cultivator.

The seeder 15 is of conventional construction, being provided with a hopper 17. A hinged clamping member 18 is adapted to engage the transverse bar or brace 16 of the cultivator and is of such configuration as to clamp securely about the bar 16. It will, of course, be understood that in some instances, the transverse bar 16 will be an annular or tubular member and in other instances will be an angular bar so that the configuration of the hinged clamping member 18 will of necessity be constructed so as to securely clamp about the particular transverse bar of the cultivator.

The clamp 18 may be provided with outstanding ears 19 and a bolt or securing member 20 may be mounted therein for drawing the ears together so as to firmly engage the clamp 18 about the transverse bar.

A seeder holder 21 is secured by bracket members 22 to opposite end portion of the seeder and the clamping members 18 are preferably bolted or otherwise secured to the periphery of the annular seeder supports 21. The supporting members 21 are preferably provided with a plurality of elongated slots 23 therethrough for adjustably receiving the bracket members 22 so that the seeder may be mounted in the desired position within the support. The bracket members 22 may be bolted as at 24 to the side walls of the seeder and secured by bolts 25 or the like to the supporting members 21.

The seeder 17 is provided with an operating shaft 26 which extends longitudinally of the seeder and is positioned at the bottom thereof, and is adapted to extend outwardly of one end of the seeder so as to receive a sprocket or gear member 27.

A sprocket member 28 is adapted to be secured to one of the wheel members 12 of the cultivator and in the preferred embodiment of this invention the sprocket member 28 may be of split construction so that it may be positioned on the cultivator wheel without removing the wheel therefrom.

An endless chain 29 is adapted to engage the sprocket 28 and the sprocket 27 so that the operating shaft 26 will rotate simultaneously with the rotation of the cultivator wheel 12. A clutch member 30 is preferably secured on the operating shaft 26 spaced inwardly from the outer end thereof and a handle 31 is provided for operation of the clutch so that the operating shaft 26 may be disengaged when it is desired to move the cultivator about the field or the like without operation of the seeder.

Where the sprocket 28 is to be mounted on a wheel having a substantially broad rim, as the wheel of a tractor, in order to properly mount the sprocket 28 on the wheel it is desirable that a plurality of outstanding arms 32 be secured at one end to the spokes of the tractor and at the outer or opposite end secured to the wheel 28. The arms 32 are adapted to be of sufficient length to position the operating member 28 outwardly of the tractor wheel. The inner ends of the arms 32 may be secured to the spokes of the tractor wheel by means of bolts 33 or the like.

In a great many of the cultivators at present in use, the wheels 12 are mounted on pivoted spindles or the like so that the wheels may be turned transversely of the frame. In cases of this kind, the width of the chain 29 is preferably greater than in cases where the wheels are not mounted on pivoted spindles so that the operating member 28 may turn laterally without its being disengaged from the chain 28, the teeth of the sprocket 28 having relative lateral movement between the links of the chain 29.

A chain tightener 34 is mounted on the frame 10 and is yieldably held in constant engagement with the chain 29 by a contractile spring member 35 so that the idling sprocket or wheel member 36 will constantly engage the chain 29 and maintain the chain in substantially taut condition.

In the use of this device, the sprocket or operating member 28 may be mounted on the wheel 12 of the cultivator or tractor, and the clamping members 18 secured about the transverse bar or brace 16 of the frame of the cultivator. The operating handle or lever 31 may be positioned so as to be convenient for operation from the seat of the cultivator and the seeder operated in the conventional manner. It is, of course, understood that the seeder 17 may be mounted either forwardly or rearwardly of the plow members 13 and that the size of the seeder may be adapted to broadcast or distribute seed over one or more rows depending upon the size and capacity of the cultivator.

It will, of course, be understood that various changes and modifications may be made in the details of construction and design of the above specifically described embodiment of the invention without departing from the spirit thereof, such changes and modifications being restricted only by the scope of the following claims.

What is claimed is:—

1. In combination with a cultivator having a frame, a seeder adapted to be removably mounted on said frame, said seeder comprising a hopper, means for mounting said hopper on said frame, said mounting means comprising a pair of slotted supporting members, bracing means adjustably engaging said supporting means and said hopper, hinged clamping means mounted on said supporting means and adapted to engage the frame of the cultivator, a sprocket, means for mounting said sprocke on the wheel of the cultivator in concentric relation thereto, and chain means connecting said sprocket and said seeder, said mounting means comprising an L-shaped member secured at one end to said sprocket and a bolt engaging the other end of the L-shaped member and the wheel.

2. In combination with a cultivator, a seed hopper adapted to be removably mounted on said cultivator, said seed hopper including slotted supporting means, hinged securing means mounted on said supporting means, said hinged securing means being adapted to engage said cultivator, a sprocket, means for centering said sprocket on a power member, and chain means connecting said sprocket and said seed hopper.

In testimony whereof I hereunto affix my signature.

WILBUR S. RECTOR.